(12) United States Patent
Thomas et al.

(10) Patent No.: US 10,713,650 B2
(45) Date of Patent: Jul. 14, 2020

(54) SYSTEM, METHOD, ARTICLE OF MANUFACTURE OF MIXED REALITY BASED, BIOMETRICALLY SIGNED REUSABLE PHYSICAL FINANCIAL INSTRUMENT

(71) Applicant: Tata Consultancy Services Limited, Maharashtra (IN)

(72) Inventors: Annie Thomas, Karnataka (IN); Shalin Garg, Karnataka (IN); Sathish Vallat, Karnataka (IN)

(73) Assignee: TATA CONSULTANCY SERVICES LIMITED (IN)

( * ) Notice: Subject to any disclaimer, the term of this patent is extended or adjusted under 35 U.S.C. 154(b) by 747 days.

(21) Appl. No.: 15/367,918

(22) Filed: Dec. 2, 2016

(65) Prior Publication Data
US 2017/0083905 A1 Mar. 23, 2017

Related U.S. Application Data

(62) Division of application No. 14/200,482, filed on Mar. 7, 2014, now Pat. No. 9,547,960.

(30) Foreign Application Priority Data

Mar. 20, 2013 (IN) .......................... 927/MUM/2013

(51) Int. Cl.
*G06K 5/00* (2006.01)
*G06Q 20/34* (2012.01)
(Continued)

(52) U.S. Cl.
CPC ....... *G06Q 20/3563* (2013.01); *G06Q 20/341* (2013.01); *G06Q 20/40145* (2013.01);
(Continued)

(58) Field of Classification Search
CPC ........ G07F 7/1008; G07F 7/08; G06Q 20/341
(Continued)

(56) References Cited

U.S. PATENT DOCUMENTS 7,353,988 B1 4/2008 Ramachandran
7,562,813 B2 7/2009 Humphrey
(Continued)

FOREIGN PATENT DOCUMENTS

WO 2014025738 A1 2/2014

OTHER PUBLICATIONS

Noor Islamic Bank, "First of its kind augmented reality banking app announced by Noor Islamic Bank", Oct. 15, 2012, United Arab Emirates.
(Continued)

*Primary Examiner* — Ahshik Kim
(74) *Attorney, Agent, or Firm* — Hayes Soloway P.C.

(57) ABSTRACT

The present invention relates to a reusable physical financial instrument and a system and a method for enabling the financial instrument to perform multiple financial transactions. The financial instrument is capable of creating mixed reality experience when it comes in vicinity of the payor or payee device or ATM. Through the created mixed reality experience, the payor and the payee inputs payor-side and payee-side transaction and biometric data which are stored onto smart chip of the instrument and/or on Cloud Storage using cloud computing interface. The stored payor-side and payee-side transaction data are cross-validated and their biometric data is further verified against golden copy at the respective financial institutions or at the Central Authority's repositories for performing the financial transaction. Upon completing the transaction, the payor-side and the payee-side data is erased, deleted or invalidated from the smart
(Continued)

chip, thus making the financial instrument reusable for performing another transaction.

4 Claims, 4 Drawing Sheets

(51) Int. Cl.
    *G07F 19/00*     (2006.01)
    *G06Q 20/40*     (2012.01)
    *G07F 7/08*     (2006.01)

(52) U.S. Cl.
    CPC .......... *G07F 7/0833* (2013.01); *G07F 7/0846* (2013.01); *G07F 19/20* (2013.01); *G07F 19/204* (2013.01)

(58) Field of Classification Search
    USPC .......................................................... 235/380
    See application file for complete search history.

(56) References Cited

U.S. PATENT DOCUMENTS

| | | |
|---|---|---|
| 2003/0229793 A1 | 12/2003 | McCall et al. |
| 2005/0192895 A1 | 9/2005 | Rogers et al. |
| 2009/0143104 A1 | 6/2009 | Loh |
| 2010/0191605 A1 | 7/2010 | Nuttall |
| 2011/0055049 A1 | 3/2011 | Harper |
| 2012/0078751 A1 | 3/2012 | MacPhail |
| 2012/0150600 A1* | 6/2012 | Isaacson ................ G06Q 30/02 705/14.23 |
| 2012/0239577 A1 | 9/2012 | Wolfs et al. |
| 2013/0191279 A1 | 7/2013 | Calman et al. |
| 2014/0330660 A1* | 11/2014 | Glass .................. G06Q 20/354 705/21 |
| 2018/0033090 A1* | 2/2018 | Khan .................... G06Q 40/12 |
| 2018/0096354 A1* | 4/2018 | Kohli ............... G06Q 20/40145 |
| 2018/0189767 A1* | 7/2018 | Bigioi ................. G06Q 20/204 |

OTHER PUBLICATIONS

Crenshaw; "Seeking the Card that Would Create a Cashless World: [Final Edition]"; The Washington Post (pre-1997 Fulltext);Apr. 3, 1994; WP Company LLC d/b/a The Washington Post; Washington D.C.

"Briefs: Canada banks launch cashless Exact card"; Journal of Commerce; Dec. 12, 1996; vol. 410, issue 28,868; Commonwealth Business Media; United States.

Official Action issued in related Indian Patent Application Serial No. 927/MUM/2013, dated Apr. 30, 2019 (7 pgs).

* cited by examiner

SYSTEM, METHOD, ARTICLE OF MANUFACTURE OF MIXED REALITY BASED, BIOMETRICALLY SIGNED REUSABLE PHYSICAL FINANCIAL INSTRUMENT

CROSS REFERENCE TO RELATED APPLICATION

This application is a divisional of U.S. patent application Ser. No. 14/200,482, filed on Mar. 7, 2014, which claims priority to Indian Patent Application No. 927/MUM/2013, filed on Mar. 20, 2013, the entire disclosures of which are incorporated herein by reference.

FIELD OF THE INVENTION

The present invention relates to an article of manufacture i.e. physical financial instrument for performing financial transactions. More particularly, the invention relates to a method and system for performing more than one financial transaction using the same physical financial instrument.

BACKGROUND OF THE INVENTION

Financial instruments have significant importance in finance and trade. Such financial instruments have a monetary value associated with them and hence they are used as a tradable asset. Since these financial instruments carry monetary value vested in them, they are representative of a legal binding and hence used for non-cash payments or transactions between two parties. There are a number of financial instruments available in the market in different shapes, sizes and in appearance such as a check/cheque, traveler's check/cheque, banker's draft, bill of exchange, promissory note, certificate of deposit, money orders, payment cards, demand draft, bonds etc. The financial instruments can be negotiable or non-negotiable. The non-negotiable financial instruments are only intended for a payee whose name is mentioned on the financial instrument. The negotiable instrument however can be claimed by any bearer by presenting his identification during deposit or encashment. These financial instruments may be issued by financial institutions like central banks, commercial banks, investment banks, credit unions etc. to a payor or a drawer. For issuing these financial instruments, the financial institution has to comply with certain set of standards, regulations and has to bear its associated cost during its manufacturing and distribution.

Financial instruments can be used for only one financial transaction that is consummated when settled in cash or electronic funds transfer. Thus, due to their characteristic nature of one-time use, the value of these consummated financial instruments i.e., after completing their transactional cycle, is exhausted to nothing less than a blank paper or blank object. Moreover, a lot of effort is required for securely recycling these consummated financial instruments (usually blank papers) for converting them into new paper products. Also, another concern that arises is maintenance of separate counters and designation of qualified human resources for manning these counters in order to securely issue, dispatch, process, and/or receive these financial instruments for performing the intended financial transactions.

Since, these financial instruments which are issued to the payor are limited in number, yet another concern comes into scenario wherein, the payor has to visit the respective financial institutions in-person. After consuming the financial instruments held, the payor may have to physically visit his respective financial institutions for receiving a new set of financial instruments. Thus, obviating the requirement to physically visit the financial institution and waiting period for issuance of fresh financial instruments is also an unaddressed need in the art. Thus, considering the above limitations which exist in the present scenario, there is a long felt need for a reusable financial instrument, a method and a system for enabling the reuse of such financial instrument for performing multiple financial transactions between two parties. Further, there is also a need to maintain authenticity and security of such reusable instruments and transactions thereof, since such instrument are prone to counterfeiting and fraud. Having only physical instruments or only electronic instruments have not been able to address these concerns. Thus, there is a need for method and system for security of the data and to ensure integrity; confidentiality of the data associated with the financial transactions processed using the financial instruments. Also, there is no mechanism available in the art to aggregate data from various types of financial instruments on a single financial instrument and then complete the transaction using the said single financial instrument. Thus, there is a long felt need to have an article, system and method that securely aggregates data from varied types of financial instruments for a transaction. This includes the need for cross-instrument transfer to a common instrument so that the common instrument acts as a carrier instrument that can be further processed.

SUMMARY OF THE INVENTION

Before the present system and method are described and the invention is enabled, it is to be understood that this application is not limited to a particular type of financial instrument, system, and methodologies associated therewith, as there can be multiple possible financial instruments which are not expressly illustrated in the present disclosure. The financial instrument according to various embodiments of the present invention may be in varied physical forms. It is also to be understood that the terminology used in the description is for the purpose of describing the particular versions or embodiments only, and is not intended to limit the scope of the present invention.

The present invention introduces a financial instrument for facilitating financial transactions. The financial instrument being as tangible and reusable comprises a smart chip, a fiduciary marker, at least one of visible indicia and invisible indicia. The smart chip is embedded within the financial instrument and capable of establishing a wireless communication. Further, the smart chip is configured to store payor-side transaction data, payor-side biometric data, payee-side transaction data, and payee-side biometric data. Further, the fiduciary marker, attached on a surface of the financial instrument, is configured for creating a mixed reality experience for a payor and a payee.

In one aspect of the present invention, a system is provided for facilitating a financial transaction between a payor and a payee using a financial instrument. The system comprises a host processor which is connected, via a communication network, with a payor device, a payee device, an automated teller machine (ATM) or KIOSK, a payor backend server, a payee backend server, and a central bank backend server. Further, the payor backend server is associated with a payor institution, and the payee backend server is associated with a payee institution. Further, the host processor is configured for facilitating the financial transaction by downstreaming first mixed reality content to the payor device for interactively engaging the payor to load payor-side data upon the financial instrument. The host processor is further configured for downstreaming second mixed reality content to the payee device for interactively engaging the payee to input payee-side data upon the financial instrument. Further, the host processor is configured for hosting at least one of a deposition and encashment of the financial instrument based upon verification and authentication of the payor-side data and the payee-side data. The payor-side data and the payee-side data are verified and authenticated against previously stored golden copies of the payor-side data and the payee-side data respectively.

In another aspect of the present invention, a method is provided for facilitating a financial transaction between a payor and a payee using a financial instrument. The method comprises connecting, via a communication network, a host processor with a payor device, a payee device, and an automated teller machine (ATM) or KIOSK, a payor backend server, a payee backend server, and a central bank backend server. Further, the payor backend server is associated with a payor institution, and the payee backend server is associated with a payee institution. Further, the host processor is configured for facilitating the financial transaction by downstreaming first mixed reality content to the payor device for interactively engaging the payor to load payor-side data upon the financial instrument. The host processor is further configured for downstreaming second mixed reality content to the payee device for interactively engaging the payee to input payee-side data upon the financial instrument. Further, the host processor is configured for hosting at least one of a deposition and encashment of the financial instrument based upon verification and authentication of the payor-side data and the payee-side data. The payor-side data and the payee-side data are verified and authenticated against previously stored golden copies of the payor-side data and the payee-side data respectively. The method further comprises recycling the financial instrument is performed by erasing or invalidating the loaded payor-side and payee-side transaction data and the biometric data as well from the re-writable memory storage smart chip of the financial instrument and issuing a future validity date to the same financial instrument in order to make it reusable for further financial transactions.

Yet in another aspect of present subject matter, a method is provided for performing financial transaction, using a first financial instrument and a second financial instrument, between a payor and a payee. The method comprises receiving, from a payor device of the payor, a scanned image of the first financial instrument on a payee device of the payee. The scanned image comprises payor-side transaction data associated with the payor, and wherein the payee device comprises a preinstalled mixed reality means. The method further comprises processing, by the payee device, the scanned image in order to extract the payor-side transaction data. Further, the method comprises creating a mixed reality experience on the payee device by logging in into the mixed reality means. The mixed reality experience is created in order to transfer the payor-side transaction data extracted from the first financial instrument to the second financial instrument associated with the payee. Further, payee-side transaction data is populated on the second financial instrument through the created mixed reality experience. The method further comprises verifying the payee-side transaction data populated and the payor-side transaction data transferred against previously stored golden copies of the payee-side transaction data and the payor-side transaction data, respectively. Further, the method comprises performing at least one of deposition and encashment, after the verification, of an amount to be deposited or enchased to the payee, thereby facilitating the financial transaction between the payor and the payee.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings various stages of the invention; however, the invention is not limited to the specific apparatus and method disclosed in the drawings.

DETAILED DESCRIPTION OF THE INVENTION

Figure 1:
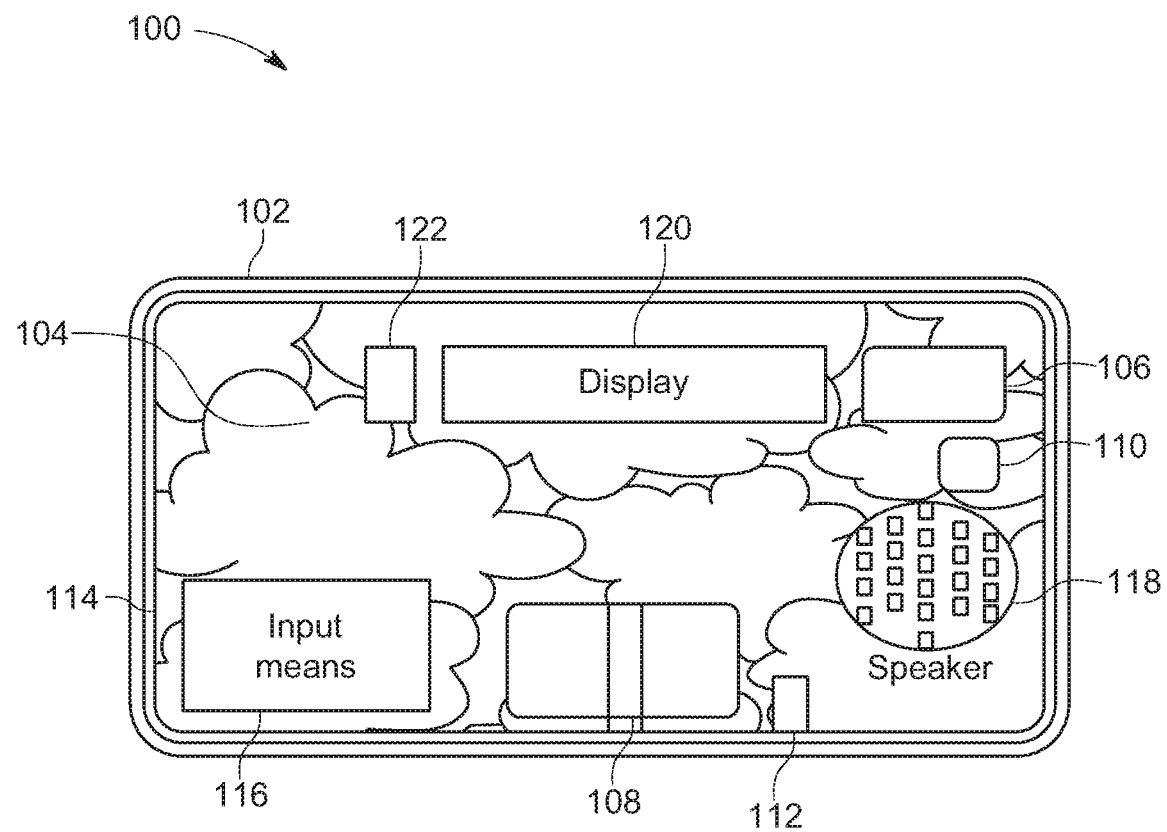
FIG. 1 shows a financial instrument (100) in the form of a token according to an embodiment of the present invention.

The invention will now be described with respect to various embodiments. The following description provides specific details for understanding of, and enabling description for, these embodiments of the invention. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

The presently described embodiments will be best understood by reference to the drawings, wherein like parts are designated by like numerals throughout. Moreover, the diagrams in the Figures illustrate the architecture, functionality, and operation of possible implementations of systems, methods, and financial instrument according to various embodiments of the present invention.

The present invention generally relates to a physical financial instrument and a system and a method for enabling the physical financial instrument for performing multiple financial transactions between a payor and a payee.

In an embodiment of the invention, a tangible, reusable and mixed reality based physical financial instrument hereinafter referred as "financial instrument" is introduced. The financial instrument comprises a re-writable memory storage smart chip which is capable of establishing wireless communication. The smart chip is capable for storing payor-side and payee-side transaction data and biometric data.

In accordance with embodiment of the present invention, the "smart chip" comprises a microprocessor, non-volatile memory and associated logic to enable it to work as a stand-alone device. Further, the "smart chip" can also have a file system configurations and the ability to be partitioned into public spaces and private spaces that can be made available or locked. There may be specific blocks or segments within the "smart chip" that are reserved for manufacturer's use, issuer's use and for consumer's use. The specific blocks or the segments can be locked and made non-rewritable for use by the intended party only. The "smart chip" may also have segregated areas for storing protected information such as certificates, e-wallets, unique identifier, and entire operating systems. Moreover, the "smart chip" may also contain secure elements.

Both, the payor-side and the payee-side transaction and biometric data are read-only data and can be deleted, erased or invalidated from the smart chip by the Central authority or the financial institutions after completing a financial transaction cycle.

The financial instrument further comprises of a "fiduciary marker" attached on its surface. The fiduciary marker is configured for creating a mixed reality experience for the payor and the payee according to the embodiments of the present invention.

The fiduciary marker can comprise of a customized theme for a financial institution, the logo, branding, and specific indicia that designates the marker unique and that may also be difficult to be replicated by fraudulent parties. The fiduciary marker may also include Data-Matrix, QR code or any other type of barcodes (1D, 2D etc.). The payor-side transaction data comprises payor's name, payor's account number, amount to be debited from the payor's account number, payor's financial institution details, a date on which the financial instrument is written, a validity date of the financial instrument usage and optionally the payee name.

The payor-side and payee-side biometric data is in the form of processed biometric template which can be at least one from a group comprising fingerprint template, iris, retina, palm vein, finger vein, signature biometrics, voice signature, olfactory, vascular patterns, keystroke, face biometrics, hand geometry, DNA, earlobe, heart beat and combinations thereof. The payor-side and payee-side biometric data for verification can be stored on the rewritable memory storage smart chip on the financial instrument or can reside in a centralized storage or cloud storage maintained by the respective payor and payee financial institutions.

According to one embodiment of the invention, the portion of the payor-side transaction and biometric data is encrypted by the payor using a payee's public key and further electronically verified or decrypted by the payee using a payee's private key. However, it should be noted that the present invention is not limited by payee's private and public key for securely verifying the data and there can be multiple methods for securing the payor-side transaction and biometric data which is further explained in embodiments of the present invention.

In one of such methods i.e., "Digital signature technique", the payor-side transaction and biometric data is considered as a clear-text read-only data which is not in encrypted form. According to this method, the authenticity of the payor can be verified either by the payee or the financial institutions by means of verifying the digital signature associated with the clear-text data. The digital signature technique is a known art for ascertaining the authenticity of sender and integrity of the data. The method is to obtain a hash of the clear-text and use a private key obtained from a public-private key authority to encrypt the hash and the encrypted hash along with payor's public key forms the digital signature. After loading, the financial instrument is handed over to the payee. On receiving the financial instrument, the payee ascertains that the received financial instrument is from the right payor; the payee decrypts the encrypted hash using the payor's public key and matches the hash made by the payee using the payor data. If the hashes match, the integrity of the data is ascertained. Likewise, the invention can use standard techniques of ensuring the authenticity of payor and payee using X.509 digital certificates and the like.

Yet in another method, a chain of public key or private key is being used for securely encrypting and decrypting the transaction and biometric data is that, the payor loads the payor-side transaction and biometric data and encrypts one copy of the payor-side transaction data with payee's public key and another copy of payor-side transaction data using payor bank's public key. Once the payee decrypts the received payor-side transaction data by using payee's private key, then the payee further uses payee bank's public key for encrypting the payee-side transaction and biometric data which is inputted by the payee. Upon that, the payor's and the payee's financial institutions will use their private keys to decrypt the payor-side and payee-side transaction and biometric data respectively during the verification stage. Thus, the recipient of the financial instrument ensures the integrity of the data from the predecessor in this chain in distinct stages. Similarly, the payee-side transaction data comprises payee name, payee's account number, payee's financial institution details and the amount considered to be deposited into payee's account as written by the payor, and the timestamp of deposit.

There are risks associated with multiple postings of the same financial instrument by a payee at multiple banks wherein the payee has in possession the physical instrument, after having electronically deposited the same. In one aspect of the invention, there is a verification of the unique reference id associated with the loaded instrument. This unique transaction reference id relates to the attributes of the loaded payor transaction data and the instrument identifier. When the payee presents the instrument during deposit or encash, the unique transaction reference id on the instrument is verified against past transaction history and pending transactions at the backend server thereby averting the risk of multiple postings.

According to some embodiments of the invention, the mixed reality experience is created when a payor logs on to a pre-installed mixed reality means from a payor device or from a financial institution designated Automated Teller Machine (ATM) or the KIOSK hereinafter referred as "ATM" and focuses an image capturing unit of the payor device or of the ATM onto the fiduciary marker of the financial instrument. Through the created mixed reality experience on the payor device or on the ATM, the payor is enabled to input payor-side transaction and biometric data which further gets wirelessly stored onto the smart chip of the financial instrument.

The purpose of storing the payor-side transaction and biometric data is to load the financial instrument with a certain amount which is considered to be deposited to the payee's account or could also be en-cashed by the payee. After loading the financial instrument by the payor, the financial instrument is handed over to the payee in order to deposit or en-cash the considered amount from the financial instrument.

According to some embodiments of the invention, the mixed reality experience is created when a payee logs on to the pre-installed mixed reality means from a payee device or from the ATM and focuses the image capturing unit of the payee device or of the ATM onto the fiduciary marker of the financial instrument. Similarly, through the created mixed reality experience on the payee device or on the ATM, the payee is intuitively enabled to input payee-side transaction and biometric data which is wirelessly stored onto the smart chip of the financial instrument.

The financial instrument further comprises of a unique visible or invisible indicia associated with the financial instrument. The visible indicia may be embossed, engraved or printed on the surface of the financial instrument. In yet another embodiment, the invisible indicia get visible in stimulating radiation at the designated KIOSKs to detect any counterfeit financial instruments.

The payor device or the payee device can be a handheld computing device such as phone, laptop, iPad etc. or a computing device like a PC or workstation.

The mixed reality means enables mixed reality experience, an augmented reality, augmented virtuality, and virtual reality and comprise of text, graphical, animation, image, audio, multimedia, haptic, visual user interface or combinations thereof.

In some alternative embodiments of the present invention, the financial instrument can further comprise of a display means, a speaker, an input means, an authentication means and a rechargeable battery for providing power backup to the financial instrument. The input means can be a PIN Pad or entry device or by means of touch and the display means can be a liquid crystal display, a light emitting means that flicker during data transfer events, e-Ink based very low power display or can be any alternative display means. The authentication means can include a biometric sensor or can be used in combination with the input means.

In some embodiment of the invention, the PIN Pad can be an effective means to deactivate or even destroy the financial instrument during forced coercion or threat or under duress and later may be re-activated by the financial institution when the threats conditions cease.

In some another alternative embodiments of the invention, the financial instrument can be in a form of rigid material with a unique clinging sound, wherein the clinging sound is audibly distinguishable to the payor or the payee in relative to a clinging sound associated with an another financial instrument or its counterfeit counterparts.

Yet, in some another alternative embodiments of the invention, the financial instrument can be a thin stamp or a sticker having a watermark which is structured in such a way that makes the financial instrument unique in relative to another watermark based stamp or sticker like financial instruments.

According to some embodiments of the invention, the financial instrument can be in a form of a token, card, disc, jeton, paper, film, plastic, polymer, glass, coin etc.

According to some embodiments of the invention, the smart chip forms a logical connection when the financial instrument comes in the vicinity of the payor's, payee's device or the ATM/Kiosk.

In another embodiment of the present invention, the system is introduced for performing the financial transaction between the payor and the payee, wherein the system comprises of the financial instrument having a wireless communication means, a fiduciary marker and the smart chip. The smart chip is capable of storing the payor-side transaction and biometric data, unique transaction reference id, as well as the payee-side transaction and biometric data. The system further comprises of the payor device, the payee device, a payor financial institution and its associated backend server, a payee financial institution and its associated backend server, a central bank and its associated backend server, the ATM and a host processor.

The term "wireless communication means" shall also be taken as a pairing communication means and can be radio frequency, Bluetooth, a Wireless Fidelity (Wi-Fi), a Worldwide Interoperability for Microwave Access (WiMAX), ZigBee, Near field communication (NFC), Infrared Data Association (IrDA), satellite or other mobile technologies supporting wireless communication. The pairing of the device and the financial instrument can be based on image/light processing, NFC, motion/accelerometer etc.

In an exemplary embodiment of the invention, the host processor is remotely connected in a communication network with the payor device, the payee device and with the ATM at one end. The host processor is further connected with the backend server of the payor financial institution, backend server of the payee financial institution and with backend server of central bank through the communication network. Each of the backend servers further comprises of a repository and a mixed reality supporting means.

The terms "payor institution" and "payee institution" should be equivalently considered for the terms "payor financial institution" and "payee financial institution" throughout the specification.

The repository of the payor institution's backend server stores a golden copy of the payor's biometric data, wherein the golden copy of the payor's biometric data is an authorized and validated copy of the payor's biometric data which is considered as a reference for authorizing and validating the existing payor's biometric data which is stored on the smart chip of the financial instrument at the time of depositing or en-cashing the financial instrument.

Similarly, the repository of the payee institution's backend server stores a golden copy of the payee's biometric data, wherein the golden copy of the payee's biometric data is an authorized and validated copy of the payee's biometric data which is considered as a reference for authorizing and validating the existing payee's biometric data which is also stored onto the smart chip of the financial instrument at the time of depositing or en-cashing the financial instrument. Further, it is to be considered that the regulations or standards such as International Organization for Standardization (ISO) and Biometric Application Programming Interface (Bio-API) standards, in place for financial institutions, are duly complied for during the enrolment, storage, processing and verification of biometric samples.

Similarly, the repository of the central bank's backend server stores both the above discussed golden copy of the payor's biometric data and the golden copy of the payee's biometric data which is also considered as a reference for authorizing and validating the existing payor-side and payee-side biometric data which is stored on the smart chip of the financial instrument at the time of depositing or en-cashing the financial instrument.

The mixed reality supporting means of each of the backend servers of the payor institution, the payee institution and the central bank is configured for supporting and storing a mixed reality content which is downstreamed and displayed on a display of the payor device, the payee device or on a display of the ATM for interactively engaging the payor and payee with the mixed reality experience. The mixed reality content comprises of text, graphical, animation, image, audio, multimedia, haptic, visual user interface or combinations thereof. The mixed reality can include avatar having speech recognition capabilities and voice biometric authentication capabilities.

In a scenario when the payor has to load the financial instrument with the payor-side transaction and biometric data, the host processor is configured to establish a wireless communication through the communication network between payor device and the payor institution's backend server in order to downstream the mixed reality content on a display of the payor device. The wireless communication is established when the payor logs on to the pre-installed mixed reality means from the payor device and the image capturing unit of the payor device is focused on the fiduciary marker of the financial instrument. Alternatively, the payor can also log on to the pre-installed mixed reality means from the ATM in order to load the financial instrument. The downstreamed mixed reality content comprises of an intuitive interface for interactively engaging the payor to load the payor-side transaction data and the payor's biometric data onto the financial instrument. A unique transaction reference id is generated by the server and sent to the payor's device and also stored at the payor institution's back end server for later verifications.

In another scenario when payee has to deposit or en-cash the loaded financial instrument, the host processor is further configured to establish a wireless communication through the communication network between the payee device or the ATM with the payee institution's and/or the central bank's backend server in order to downstream the mixed reality content on display of the payee device or on display of the ATM. The wireless communication is established when the payee logs on to the pre-installed mixed reality means from the payee device or from the ATM and image capturing unit of either of the payee device or of the ATM is focused on the fiduciary marker of the financial instrument. The downstreamed mixed reality content comprises of the intuitive user interface for interactively engaging the payee for inputting payee-side transaction data and payee's biometric data in order to deposit OR en-cash an amount considered to be deposited at the payee institution.

Upon establishing the wireless connection according to the above discussed two scenarios between the payor institution, the payee institution, the ATM, the central bank and the backend servers of the payor institution, the payee institution and the central bank, the host processor is further configured for hosting the deposit or encashment of the loaded financial instrument by validating the financial instrument's validity. The unique transaction reference id on the smart chip is verified against the reference id stored on the financial institution's backend server against the risks of multiple postings described earlier. Upon verifying and authenticating both the payor-side and payee-side transaction and biometric data from the financial instrument in relative to the previously stored golden copy data of the payor's and the payee's biometric data, a series of electronic instructions are issued by the payee's financial institution for initiating transfer of funds from payor's account to the payee's account by means of transferring data. The transferring data between the payor's and the payee's financial institutions enables for preparing accounting entries in order to debit an amount from payor's account and credit the debited amount to payee's account which is considered to be deposited, thus completing the financial transaction.

As discussed above, the pre-stored golden copy of the payor biometric data and the payee biometric data is stored at the repository of the central bank's backend server or at the repositories of payor institution's and payee institution's backend servers.

Thus, upon completing the financial transaction between the payor and the payee, the stored payor-side and payee-side transaction data and biometric data which is stored onto the smart chip of the financial instrument can be deleted, erased or invalidated by recycling the financial instrument in order to make the financial instrument reusable for further financial transactions between a payor and a payee. The financial instrument can be recycled by the payee financial institution or the central bank at the end of the transaction cycle and/or explicitly by the payee himself by selecting the recycle option in the user interface of the mixed reality experience.

According to some other embodiments of the invention, a method of conducting an aggregate deposit of multiple financial instruments to a target financial instrument is described. According to this scenario, multiple payors having their loaded financial instruments and a single payee having the target financial instrument is considered. The method of aggregate deposit is useful when there is a single counter or point of contact where the multiple financial instruments are to be deposited. Here, a person representing the counter or the point of contact is considered as the payee having a single financial instrument i.e., the target financial instrument which is associated with payee's account and the payee having the payee device with the mixed reality means installed therein. The payee device is in wireless communication with the payee institution and its associated backend server and with the central bank and its associated backend server. The multiple financial instruments are collected at the counter or the point of contact, wherein each financial instrument is already loaded by its respective payor. After collecting the multiple loaded financial instruments, the step of depositing of each financial instrument is performed by the payee.

The payee i.e., the person representing the counter or the point of contact selects one of the financial instruments from the multiple loaded financial instruments and logs on to the pre-installed mixed reality means from the payee device. After logging in into the mixed reality means, the payee focuses the image capturing unit of payee device onto the attached fiduciary marker of selected financial instrument for creating a mixed reality experience. From the mixed reality experience, the payee is first verified to be the intended recipient of the financial instrument and thereafter the payor-side transaction and biometric data which is stored on the smart chip of the selected financial instrument is extracted for verification and validation, a unique transaction reference id is generated by the server and sent to payor's device before transfer to the target instrument. The extracted payor-side transaction and biometric data is verified against the pre-stored golden copy of payor-side transaction and biometric data before transferring the extracted payor-side transaction and biometric data onto the target financial instrument. Once the payor-side transaction and biometric data is verified, the payee further transfers the extracted and verified payor-side transaction and biometric data onto the target financial instrument for deposit thereon.

Thus, the step of extraction, verification and transferring of the payor-side transaction and biometric data is individually performed for each of the financial instruments from the collected multiple financial instruments by the payee.

After extracting, verifying and transferring the payor-side transaction and biometric data of each financial instrument, the financial instruments are recycled by means of erase or invalidation of the payor-side transaction and biometric data from each financial instrument in order to make it reusable for further financial transactions.

Thereafter, the target financial instrument containing the multiple verified payor-side transaction and biometric data is deposited by the payee in order to deposit the multiple amounts of each financial instrument which is considered to be deposited into the payee's account at payee institution.

Yet, according to another embodiment of the invention, a method for transferring the payor-side transaction and biometric data from one type of financial instrument (scanned image) to another type of financial instrument i.e., the physical financial instrument according to the present subject matter is introduced. Thus, the financial instrument may be used as a carrier instrument for transferring the payor-side transaction and biometric data. According to this method the payor having a payor device captures images of the front and rear faces of the financial instrument, endorses them and transfers the image to the payee device. The transferred scanned image of the financial instrument is already loaded with the payor-side transaction data by the payor. In another method, the payor may directly hand over the financial instrument to the payee, after loading the payor-side transaction and biometric data onto the financial instrument. Upon receiving the scanned image of the financial instrument, the payee introduces the scanned image of the financial instrument by logging in into the pre-installed mixed reality means from the payee device. The payee will provide the payee-side biometrics, the type of the financial instrument and payor-side transaction data is extracted by an image processing means. The image processing means can be provided by the payee institution or alternatively can also be obtained as a service from third party sources. A unique transaction reference id is generated at the server that relates to the attributes of the payor-side transaction data and the instrument identifier and sent to the payee device. This unique transaction reference id on the smart chip is verified against the reference id stored on the financial institution's backend server during presentment against the risks of multiple postings described earlier.

The scanned image of the financial instrument can be in a form of Check21 or any type of electronic or image format of the financial instrument. In one embodiment, the scanned image of the financial instrument may be selected from a group comprising a check, a traveler's check, a demand draft, money order, a bond, a certificate of deposit and combinations thereof. It is to be noted that the scanned image of the financial instrument comprises a full set of warranties and indemnities applicable to banks of first deposit and clearing banks which enables electronic presentment from payor to payee under the Uniform Commercial Code and extends existing Check 21 regulations between payor and payee. According to embodiments of present subject matter, the payor-side biometric data may be stored on cloud and a reference id associated to the payor-side biometric data may be included with the scanned image of the financial instrument. The image processing means of the payee device is also capable for endorsing, voiding and for assigning item numbering to the financial instruments.

After the extraction, the payee focuses the image capturing unit of the payee device on the payee's financial instrument which is in the physical form and the mixed reality experience is created on the payee device. From the created mixed reality experience, the payee stores the extracted payor-side transaction data and further populates the payee-side transaction and biometric data onto the smart chip of the payee's financial instrument (physical form). Alternatively, the reference of the response data stored on the Cloud can be stored on the financial instrument in case of storage space issues on the embedded memory.

The payor-side transaction data comprises of an amount which is considered to be deposited at the payee's account or can also be en-cashed by the payee.

Both, the populated payee-side transaction and biometric data and the extracted and stored payor-side transaction and biometric data from the financial instrument is verified and authenticated in relative to the previously stored golden copy data of the payor's and the payee's biometric data which is stored at the central bank's repository or at the payor and payee institution's repository. After the verification and authentication, the amount which is considered to be deposited at the payee's account gets deposited at the payee's account or en-cashed by the payee.

In another embodiment of the invention, multiple antedated or post-dated payments can be made by the payor to the payee using a single financial instrument. By facilitating the antedated or the post-dated payments to the payee, the payee can realize the transactions when the value date approaches and the loaded amount is blocked or reserved for the future payments so that the payee is assured of receiving the amount during deposit or encashment.

In another embodiment of the present invention, a cloud computing interface is introduced for the payor's financial institution and for the Central Bank. The payor can send the payor-side transaction data and the payor's biometric data to the cloud computing interface in order to be processed. Upon processing the payor-side transaction data and the payor's biometric data sent by the payor, a hash or a metadata or a reference key is generated. The hash or the metadata or the reference key generated is sent to the payor and is stored onto the re-writable memory storage of the chip. Thereafter, the financial instrument is handed over to the payee. In a similar manner, the payee can send the payee-side transaction and biometric data to the cloud computing interface for processing and store the response reference key on to the smart chip.

Yet in another embodiment of the invention, an immersive mixed reality experience is introduced. Through the immersive mixed reality experience, the financial instrument is enabled for being communicable by wireless means in order to store the electronic stream of data onto the financial instrument. All the parties in the payment space may be notified regarding the intent, interaction, user behavior and related actions. Further, verifying a unique transaction reference id stored on the smart chip with the backend server helps in tracking the instrument's usage. Further, any suspicious activity or tampering with the structured workflows is alerted to all the parties involved thereby averting threats in the transaction. Also, the payor-side and the payee-side transaction data as well as biometric data lead to an electronic verification of the parties involved in the transaction ensuring non-repudiation of the data. Therefore, through the above discussed straight-through-processing technique saves processing time during the electronic verification.

Yet in another embodiment of the invention, the payee is also enabled to convert the financial instrument received by the payor into a negotiable financial instrument. The negotiable financial instrument is payable to the order of an identified person through a special endorsement or to the bearer of the instrument through a blank endorsement so that the negotiable financial instrument can be used in lieu of cash payments.

In another embodiment of a method for aggregation deposit from a plurality of financial instruments by means of transfer of the payor-side transaction data from one type of financial instrument (scanned image) to another type of physical financial instrument which is the subject matter of the invention is introduced. According to this method the payor hands over physical financial instruments such as checks to the payee. The payee logs on to the pre-installed mixed reality means from the payee device and focuses on the fiduciary marker using the image capture device and selects the 'Instrument Transfer' option from the user interface and is now allowed to select the type of instrument and scan the physical document of the financial instrument, say a check and thereby extract the transaction data associated with it. The present invention can be used, to deposit other types of financial instruments, as a carrier instrument for cross-instrument transfer. However, the clearing and settlement processes for the respective transferred instruments will be in place to complete the ecosystem needed for the processing. Both the payor institution and the payor are notified during this deposit or encash stage. Next, the preferred embodiments of the present invention will be described below based on drawings.

FIG. 1 shows a financial instrument (100) in the form of a token according to an embodiment of the present invention. The financial instrument (100) is capable of performing multiple financial transactions between a payor and a payee. The financial instrument (100) which is in the form of a token (102) comprises of the fiduciary marker (104), unique indicia (106) the smart chip (108) and an antenna (114). The smart chip (108) is wirelessly communicable and re-writable memory storage smart chip (108). The smart chip (108) is further capable for storing payor-side transaction and biometric data and the payee-side transaction and biometric data. Both, the payor-side and payee-side transaction and biometric data can be deleted, erased or invalidated from the smart chip (108) after completing at least one financial transaction cycle.

Further, the financial instrument (100) may also include an input means (116), a speaker (118), a display means (120), an authentication means (122), a microcontroller with embedded memory (110) and a rechargeable battery (112).

Figure 2:
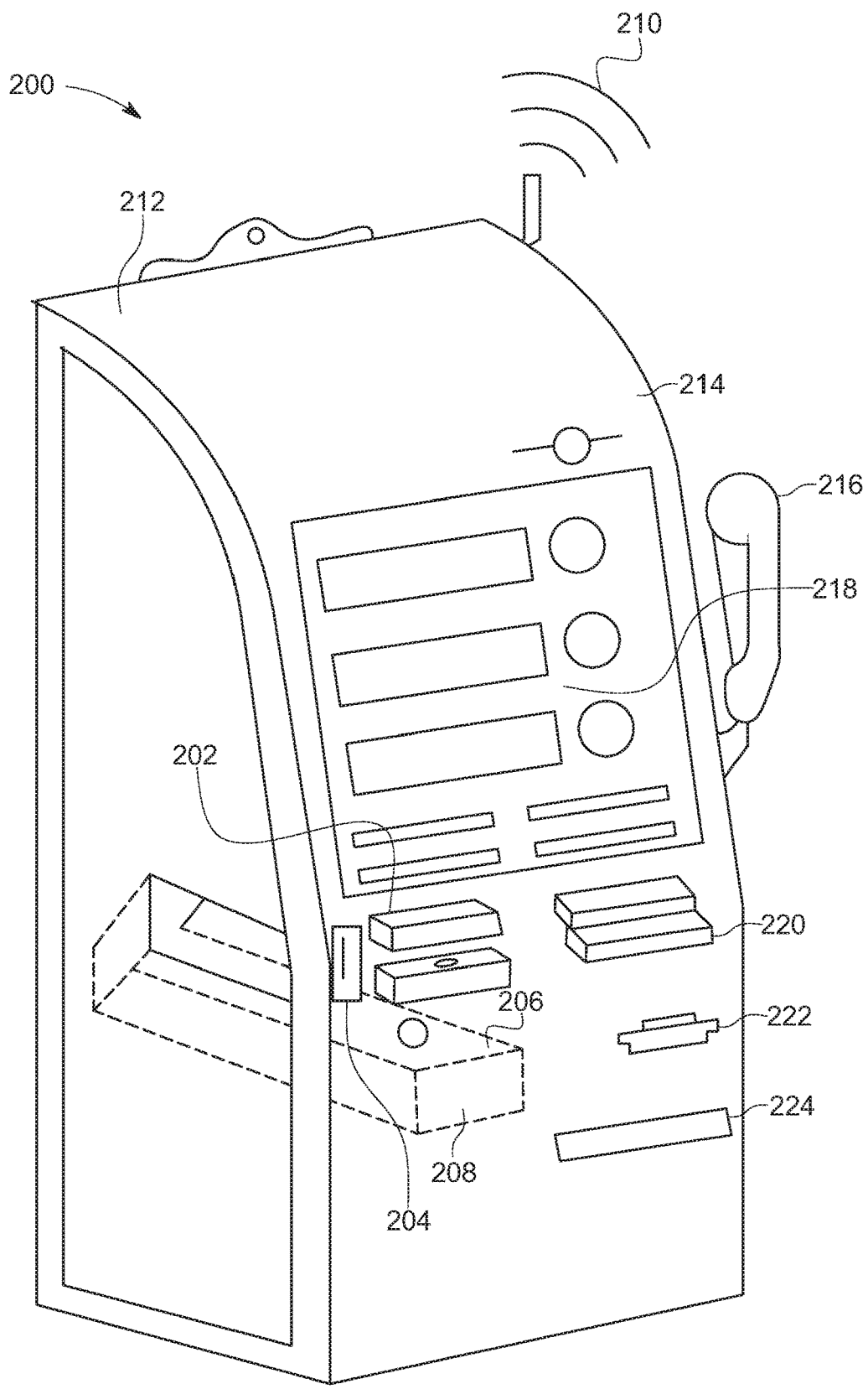
FIG. 2 is an architecture diagram (200) of the financial institution designated ATM or the KIOSK.

FIG. 2 is an architecture diagram (200) of the financial institution designated ATM or the KIOSK i.e., referred as "ATM". The ATM comprises of an enclosure (202), a deposit slot (204), fingerprint reader (206), moving pedestal having biometric reader (208), wireless connectivity (210), face recognition camera (212), an iris capture device (214), IP phone (216), interactive display (218), cash dispenser (220), print receipt dispenser (222), The enclosure (202) further comprises an image capturing unit (not shown in the diagram) and wireless reader (not shown in the diagram) for reading the wirelessly communicable smart chip (108 of FIG. 1) of the financial instrument (100 of FIG. 1). The entire housing of the said ATM is secured in communication with on-board PKI-like security infrastructure for the sensitive user data.

The financial instrument (100 of FIG. 1) is placed into the enclosure (202) by a payor or by a payee for different purposes. One of such purpose is when the payor wants to load the financial instrument (100 of FIG. 1) by inputting the payor-side transaction and biometric data. Similarly, another purpose is when the payee wants to deposit or en-cash the financial instrument (100 of FIG. 1) which is loaded and given by the payor.

Taking into consideration the above discussed purposes, as soon as the financial instrument (100 of FIG. 1) is placed into the enclosure (202) depending upon the wireless connectivity (210), the image capturing unit of the enclosure (202) gets activated and focused on the fiduciary marker (104 of FIG. 1) of the financial instrument (100 of FIG. 1) for creating a mixed reality experience on the interactive display (218) of the ATM.

For creating the mixed reality experience, the fiduciary marker (104 of FIG. 1) of the financial instrument (100 of FIG. 1) sends a request to the mixed reality supporting means {(308 of FIG. 3) or (316 of FIG. 3) or (324 of FIG. 3)} of their respective backend servers {(304 of FIG. 3) or (312 of FIG. 3) or (320 of FIG. 3)}. The intended mixed reality supporting means to which the request is sent, responds by downstreaming the mixed reality contents which is represented in the form of an intuitive user interface (336 of FIG. 4) of the interactive display (218) of the ATM. The ATM may further include a "token dispenser" (224) for issuing financial instruments for a payor.

In accordance with another embodiment of the present invention, the ATM can also use optical means for providing a user interface to a payor and a payee for the purpose of loading and depositing/en-cashing the financial instrument.

The interactive display (218) can be a touch-screen based display for interactively engaging the payor and the payee to load, deposit or en-cash the financial instrument (100 of FIG. 1). It can also be enabled with audio, haptic, textual, visual, animated, graphical and augmented content like avatars that provide an intuitive and immersive experience In some other embodiments of the invention, the ATM is also capable for supporting different types of biometric authentication. For this, the different biometric authentication means such as the face recognition camera (212), the iris capture device (214) and the IP phone (216) are provided. These biometric authentication means {(212), (214), and (216)} gets activated and positions itself in response of the moving pedestal having the biometric reader (208). Further, it should be noted that, with the help of the interactive display (218) and the available biometric authentication means {(212), (214), and (216)}, the present invention can also be carried out by a visually disabled person.

Figure 3:
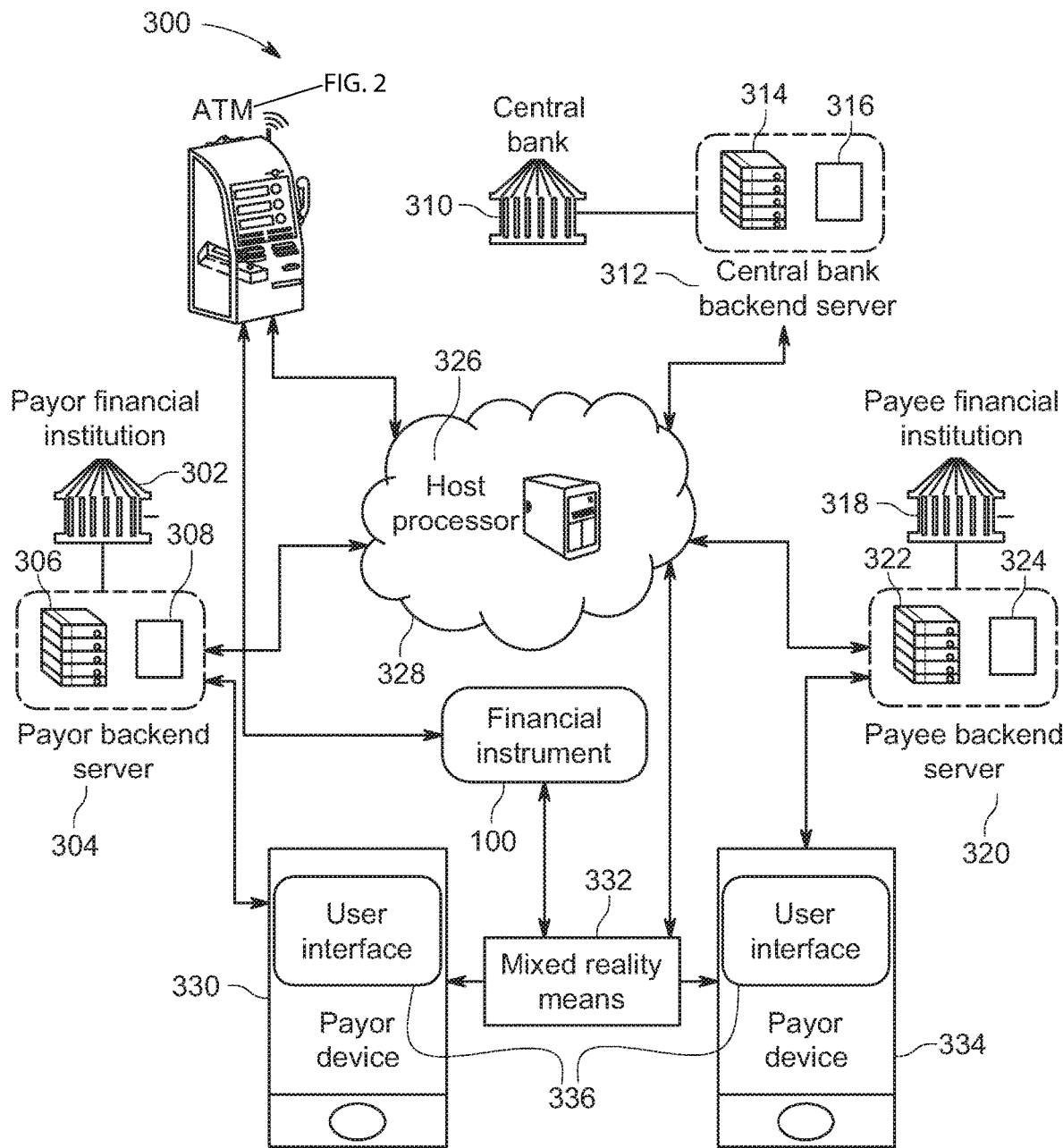
FIG. 3 is the system architecture diagram (300) illustrating multiple embodiments of the present invention.
Figure 4:
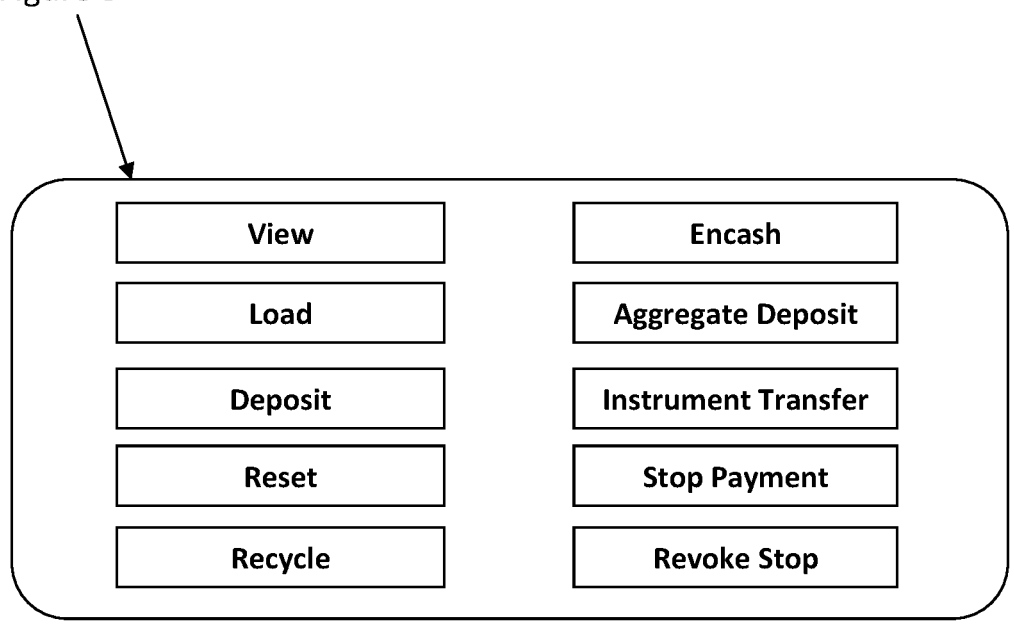
FIG. 4 shows an intuitive user interface (336 of FIG. 3) representing multiple options which is presented to the payor and the payee after logging in into the mixed reality means.

FIG. 3 is the system architecture diagram (300) illustrating multiple embodiments of the present invention. The system comprises of the financial instrument (100 of FIG. 1), the payor device (330), the payee device (334), the mixed reality means (332), a payor financial institution (302) and its associated payor backend server (304), a payee financial institution (318) and its associated payee backend server (320), a central bank (310) and its associated central bank backend server (312), the ATM (FIG. 2) and a host processor (326).

The host processor (326) wirelessly connects the payor device (330), the payee device (334) and the ATM (FIG. 2) through the communication network (328) at one end. The host processor (326) is further connected with the payor backend server (304), the payee backend server (320) and the central bank backend server (312) at another end. Each of the backend servers further comprises of a repository and a mixed reality supporting means.

Considering a scenario when a payor wants to load the financial instrument (100 of FIG. 1) from the payor device (330), the host processor (326) is configured to establish a wireless communication through the communication network (328) between the payor device (330) with the payor backend server (304) in order to downstream the mixed reality content on a display of the payor device (330). The wireless communication is established when the payor logs to the pre-installed mixed reality means (332) from the payor device (330) and the image capturing unit of the payor device (330) is focused on the fiduciary marker (104 of FIG. 1) of the financial instrument (100 of FIG. 1).

In an alternative embodiment of the invention, a payor can also log on to the pre-installed mixed reality means (332) from the ATM (FIG. 2) in order to load the financial instrument (100 of FIG. 1). The downstreamed mixed reality content comprises of an intuitive user interface (336) for interactively engaging the payor to load the payor-side transaction and biometric data which gets further wirelessly stored onto the smart chip (108) of the financial instrument (100 of FIG. 1).

Considering an another scenario, when the payee has to deposit or en-cash the loaded financial instrument (100 of FIG. 1) at an ATM (FIG. 2), the host processor (326) is further configured to establish the wireless communication through the communication network (328) between the payee device (334) or the ATM (FIG. 2) with the payee backend server (320) or the central bank backend server (312) in order to downstream the mixed reality content on to the display of the payee device (334) or on an interactive display (218 of FIG. 2) of the ATM (FIG. 2). The wireless communication is established when the payee logs on to the pre-installed mixed reality means (332) from the payee device (334) or from the ATM (FIG. 2) and the image capturing unit of either of the payee device (334) or the ATM (FIG. 2) is focused on the fiduciary marker (104 of FIG. 1) of the financial instrument (100 of FIG. 1). The downstreamed mixed reality content comprises of an intuitive user interface (336) for interactively engaging the payee for inputting payee-side transaction data and biometric data in order to deposit OR en-cash an amount considered to be deposited at the payee institution.

After establishing the wireless connection according to the above discussed two scenarios, the host processor (326) is further configured for hosting the deposit or encashment of the loaded financial instrument by validating the financial instrument's validity and the validity of the transaction. The host processor (326) hosts the verification and authentication of both the payor-side and payee-side transaction and biometric data from the financial instrument (100 of FIG. 1) in relative to the previously stored golden copy of the payor's and the payee's biometric data. The golden copy of the payor biometric data is stored in the repository (306) of the payor backend server (304) or at the repository (314) of the central bank backend server (312). Similarly, the golden copy of the payee biometric data is stored in the repository (322) of the payee backend server (320) or in the repository (314) of the central bank backend server (312).

Thus, upon verifying and validating the payor-side and payee-side transaction and biometric data in relative to the pre-stored golden copy data, the amount considered to be deposited gets deposited into the payee's account at payee financial institution (318) or en-cashed from the cash dispenser (220) of the ATM (FIG. 2).

Thus, upon completing the financial transaction between a payor and a payee, the stored payor-side transaction and biometric data and payee-side transaction and biometric data which is stored onto the smart chip (108 of FIG. 1) of the financial instrument (100 of FIG. 1) can be deleted, erased or invalidated by recycling the financial instrument (100 of FIG. 1) in order to make the financial instrument (100 of FIG. 1) reusable for further financial transactions between the payor and the payee.

BEST MODE FOR PERFORMING THE INVENTION

For performing the financial transaction between a payor and a payee, the payor having the financial instrument (100 of FIG. 1) and the payor device (330 of FIG. 3), the payor device (330 of FIG. 3) having the mixed reality means (332 of FIG. 3) installed in it. The financial instrument (100 of FIG. 1) is issued to the payor by the payor financial institution (302 of FIG. 3) or from the central bank (310 of FIG. 3) or can be dispensed from the token dispenser (224) of ATM (FIG. 2). Further, the mixed reality means (332 of FIG. 3) is issued to the payor and the payee, by the payor financial institution (302 of FIG. 3) and payee financial institution (318 of FIG. 3) respectively.

The financial instrument (100 of FIG. 1) having the fiduciary marker (104 of FIG. 1) attached on its surface is configured for creating the mixed reality experience for the payor and the payee. The mixed reality experience is created when the payor logs on to a pre-installed mixed reality means (332 of FIG. 3) from the payor device (330 of FIG. 3) and focuses the image capturing unit of the payor device (330 of FIG. 3) onto the attached fiduciary marker (104 of FIG. 1) on the financial instrument (100 of FIG. 1). From the created mixed reality experience an intuitive user interface (336 of FIG. 4) is displayed on the display of the payor device (330 of FIG. 3). The intuitive user interface (336 of FIG. 4) displays multiple different options (shown in FIG. 4) i.e., "LOAD TOKEN", "DEPOSIT TOKEN", "ENCASH TOKEN", "AGGREGATE DEPOSIT", "VIEW TOKEN", "INSTRUMENT TRANSFER", "RECYCLE TOKEN", "RESET TOKEN", "STOP PAYMENT" and "REVOKE STOP PAYMENT" which can be further selected by the payor and the payee.

In the embodiments of the invention, the "VIEW TOKEN" option may be chosen by the payee in order to view the payor-side transaction data loaded by the payor. The payee can also select the "AGGREGATE DEPOSIT" option in order to perform an aggregation deposit from a plurality of financial instruments into a target financial instrument (physical financial instrument). Similarly, the "INSTRUMENT TRANSFER" option can be chosen by the payee in order to perform cross-instrument transfer (in the form of a scanned image). Further, the payee or payor can also select the "RECYCLE TOKEN" option in order to recycle the financial instrument after performing the financial transaction. Moreover, the "RESET TOKEN" can be chosen by the payor or the payee in order to reset the data entered by the payor or the payee. By choosing the "RESET TOKEN" option, the payor or the payee can also edit the data, wherein the payee is not allowed to edit the payor-side data. Yet from the displayed option in the intuitive user interface (336 of FIG. 4), the payor can select the "STOP PAYMENT" option in order to stop the processing of an financial instrument which is already loaded with the payor-side data and given to the payee. Thereafter, in order to revoke the "STOP PAYMENT" option chosen by the payor, the payor can further select the "REVOKE STOP PAYMENT" option.

According to the present scenario, a payor selects a "LOAD TOKEN" option for inputting the payor-side transaction and biometric data which gets wirelessly stored onto the smart chip (108 of FIG. 1) of the financial instrument (100 of FIG. 1) through the created mixed reality experience. Thus, the financial instrument (100 of FIG. 1) gets loaded with the payor-side transaction and biometric data.

Alternatively, a payor can also load the financial instrument (100 of FIG. 1) from the ATM (FIG. 2). For this, the payor logs to the pre-installed mixed reality means (332 of FIG. 3) from the ATM (FIG. 2) and place the financial instrument (100 of FIG. 1) into an enclosure (202 of FIG. 2) of the ATM (FIG. 2). The enclosure (202 of FIG. 2) of the ATM (FIG. 2) is capable for holding the financial instrument (100 of FIG. 1) and also having an image capturing unit attached therein. Upon placing the financial instrument (100 of FIG. 1) into the enclosure (202 of FIG. 2), the image capturing unit is activated and focused on the placed financial instrument (100 of FIG. 1) for creating the mixed reality experience. From the created mixed reality experience the user interface (336 of FIG. 4) is displayed with multiple options on the interactive display (218 of FIG. 2) of the ATM (FIG. 2). From the displayed multiple options of the intuitive user interface (336 of FIG. 4) the payor selects the "LOAD TOKEN" option in order to input the payor-side transaction and biometric data which is wirelessly stored onto the smart chip (108 of FIG. 1) of the financial instrument (100 of FIG. 1) through the created mixed reality experience. Thus, a payor can load the financial instrument (100 of FIG. 1) by logging in into the pre-installed mixed reality means (332 of FIG. 3) from the payor device (330 of FIG. 3) or from the ATM (FIG. 2).

After the payor loads the financial instrument (100 of FIG. 1), it is handed over to the payee in order to deposit or en-cash the financial instrument (100 of FIG. 1).

For depositing the financial instrument (100 of FIG. 1), a payee logs on into the pre-installed mixed reality means (332 of FIG. 3) from the payee device (334 of FIG. 3) and focuses the image capturing unit of the payee device (334 of FIG. 3) onto the attached fiduciary marker (104 of FIG. 1) of the financial instrument (100 of FIG. 1) for creating a mixed reality experience. From the created mixed reality experience, the intuitive user interface (336 of FIG. 4) is displayed on the display of the payee device (334 of FIG. 3). From the displayed user interface (336 of FIG. 4), the payee selects "DEPOSIT TOKEN" option by which the payee is prompted to input the payee-side transaction and biometric data which get wirelessly stored onto the smart chip (108 of FIG. 1) of the financial instrument (100 of FIG. 1). Optionally, the payee can also deposit the financial instrument (100 of FIG. 1) by logging in into the pre-installed mixed reality means (332 of FIG. 3) from the ATM (FIG. 2).

The smart chip (108 of FIG. 1) having payor-side and payee-side transaction and biometric data respectively is verified and authenticated against the previously verified and authorized golden copy of the payor's biometric data and payee's biometric data. The payor-side transaction data comprises of an amount which is considered to be deposited into the payee's account at payee financial institution (318 of FIG. 3). Also, the amount can be en-cashed by the payee which is further explained in the other scenarios of the invention where the payee wishes to en-cash the financial instrument (100 of FIG. 1) by selecting the option "ENCASH TOKEN" from the user interface (336 of FIG. 4). Thus, after verifying the existing payor-side transaction and biometric data and payee-side transaction and biometric data against the golden copy of the payor-side and payee side transaction and biometric data respectively, the amount which is considered to be deposited gets deposited into the payee's account at the payee financial institution (318 of FIG. 3).

In accordance with another embodiment of the present invention, the payee can also choose a split option of deposit and encash at an ATM (FIG. 2). By choosing the split option, a portion of the amount in the financial instrument can be deposited into the payee's account at the payee financial institution (318 of FIG. 3) and the rest of the amount can be en-cashed from the ATM (FIG. 2) where the financial instrument is presented for en-cashing.

In another scenario, where a payee wants to en-cash the financial instrument (100 of FIG. 1), the payee is required to visit the ATM (FIG. 2). The payee logs on to the pre-installed mixed reality means (332 of FIG. 3) from the ATM (FIG. 2) and places the financial instrument (100 of FIG. 1) into the enclosure (202 of FIG. 2) of the ATM (FIG. 2). The enclosure (202 of FIG. 2) having the image capturing unit attached therein gets activated and focused on the fiduciary marker (104 of FIG. 1) of the financial instrument (100 of FIG. 1) for creating the mixed reality experience. From the created mixed reality experience, the intuitive user interface (336 of FIG. 4) is displayed on the interactive display (218 of FIG. 2) of the ATM (FIG. 2). From the displayed user interface (336 of FIG. 4), the payee selects "ENCASH TOKEN" option by which the payee is prompted to input the payee-side transaction and biometric data which is wirelessly stored onto the smart chip (108 of FIG. 1) of the financial instrument (100 of FIG. 1).

The smart chip (108 of FIG. 1) having the existing payor-side transaction and biometric data inputted by the payor and the existing payee-side transaction and biometric data inputted by the payee is verified and authenticated against the previously stored golden copy of the payor's biometric data and the payee's biometric data. The payor-side transaction data comprises an amount which is considered to be deposited or en-cashed by the payee.

Thus, after verifying the existing payor-side transaction and biometric data and payee-side transaction and biometric data against the golden copy of the payor-side and payee side transaction and biometric data respectively, the amount which is considered to be en-cashed by the payee is dispensed from the cash dispenser (220 of FIG. 2) of the ATM (FIG. 2). Thus, the payee can collect the dispensed amount from the ATM (FIG. 2).

After depositing or en-cashing the financial instrument (100 of FIG. 1) i.e., after successfully performing the financial transaction, the financial instrument (100 of FIG. 1) is further placed into the deposit slot (204 of FIG. 2) of the ATM (FIG. 2) in order to recycle the financial instrument (100 of FIG. 1) by deleting or erasing or invalidating the stored payor-side transaction and biometric data and payee-side transaction and biometric data. Thus, by recycling the financial instrument (100 of FIG. 1), it becomes reusable for performing another financial transactions.

The methodology and techniques described with respect to the exemplary embodiments can be performed using computer-implemented system or other computing device within which a set of instructions, when executed, may cause the said computer-implemented system to perform any one or more of the methodologies discussed above. The said computer-implemented system may include a processor embedded within the said computer-implemented system which is configured for executing the said programmed instructions or the said set of instructions. The said computer-implemented system is configured for executing programmed instructions or set of instruction to perform a particular task. According to the embodiments of the present invention, the computer-implemented system may also operate as a standalone device.

Although the invention has been described in terms of specific embodiments and applications, persons skilled in the art can, in light of this teaching, generate additional embodiments without exceeding the scope or departing from the spirit of the invention described herein.

We claim:

1. A financial instrument for facilitating financial transactions, the financial instrument comprises:

a smart chip, embedded within the financial instrument, capable of establishing a wireless communication, wherein the smart chip is configured to store payor-side transaction data, payor-side biometric data, payee-side transaction data, and payee-side biometric data;

a fiduciary marker attached on a surface of the financial instrument, wherein the fiduciary marker is configured for creating a mixed reality experience for payor and a payee, wherein the mixed reality experience is created to transfer the payor-side transaction data extracted from the financial instrument of the payor to the financial instrument associated with the payee and the transaction data is populated on the financial instrument associated with the payee through the created mixed reality experience; and at least one of visible indicia and invisible indicia present on the financial instrument.

2. The financial instrument of claim 1 further comprises an antenna, input means, display means, authentication means, a speaker, a microcontroller with embedded memory, and a rechargeable battery.

3. The financial instrument of claim 1, wherein the smart chip is having re-writable storage configured for establishing a wireless communication for the financial instrument with payor's device and payee's device, wherein the payor device and the payee device comprises at least one a phone, a laptop, an iPad, a personal computer, a workstation, and an automated teller machine (ATM) or kiosk.

4. The financial instrument of claim 1, wherein the financial instrument is in a form of at least one of:
- a rigid metal with a unique clinging sound, wherein the clinging sound is audibly distinguishable to the payor or the payee in relative to a clinging sound associated with an another financial instrument;
- a thin stamp or a sticker having a watermark which is structured in such a way that makes the financial instrument unique in relative to another watermark based stamp or sticker like financial instruments; and
- a token, a card, a disc, a jeton, a paper, a film, a plastic, a polymer, a glass and a coin.

* * * * *